US012193134B2

(12) United States Patent
Kawase et al.

(10) Patent No.: US 12,193,134 B2
(45) Date of Patent: Jan. 7, 2025

(54) X-RAY GENERATING APPARATUS AND X-RAY IMAGING APPARATUS

(71) Applicant: Canon Anelva Corporation, Kawasaki (JP)

(72) Inventors: Junya Kawase, Yokohama (JP); Hiroshi Saito, Ayase (JP)

(73) Assignee: Canon Anelva Corporation, Kawasaki (JP)

( * ) Notice: Subject to any disclaimer, the term of this patent is extended or adjusted under 35 U.S.C. 154(b) by 0 days.

(21) Appl. No.: 18/782,498

(22) Filed: Jul. 24, 2024

(65) Prior Publication Data

US 2024/0381514 A1 Nov. 14, 2024

Related U.S. Application Data

(63) Continuation of application No. PCT/JP2022/016707, filed on Mar. 31, 2022.

(51) Int. Cl.
*H05G 1/02* (2006.01)
*H01J 35/16* (2006.01)
(Continued)

(52) U.S. Cl.
CPC ............ *H05G 1/025* (2013.01); *H01J 35/16* (2013.01); *H05G 1/04* (2013.01);
(Continued)

(58) Field of Classification Search
CPC . H05G 1/025; H05G 1/04; H01J 35/16; H01J 2235/1216; H01J 2235/1262; H01J 2235/167
See application file for complete search history.

(56) References Cited

U.S. PATENT DOCUMENTS

| | | | |
|---|---|---|---|
| 5,309,497 | A | 5/1994 | Goetzl et al. |
| 10,645,788 | B2 | 5/2020 | Endo et al. |

(Continued)

FOREIGN PATENT DOCUMENTS

| | | | |
|---|---|---|---|
| JP | H065381 | A | 1/1994 |
| JP | 2012028093 | A | 2/2012 |

(Continued)

OTHER PUBLICATIONS

International Preliminary Report on Patentability (PCT/IPEA/409) issued in corresponding International Patent Application No. PCT/JP2022/016707 dated Jul. 26, 2023. (10 pages).

(Continued)

*Primary Examiner* — Chih-Cheng Kao
(74) *Attorney, Agent, or Firm* — Buchanan Ingersoll & Rooney PC

(57) ABSTRACT

X-ray generating apparatus includes X-ray generating unit having first and second bottom surfaces and side surface; driving circuit; accommodation housing accommodating the X-ray generating unit and the driving circuit; and insulating component arranged in the accommodation housing and having first insulating member arranged between the driving circuit and the accommodation housing and second insulating member arranged between the X-ray generating unit and the accommodation housing. First space is defined between the first insulating member and the accommodation housing, second space is defined between the second insulating member and the accommodation housing, third space is defined between the side surface and the second insulating member, fourth space is defined by the second bottom surface and internal surface of the first insulating member. The second space communicates with the third space, the first space communicates with the fourth space.

9 Claims, 5 Drawing Sheets

(51) Int. Cl.
*H05G 1/04* (2006.01)
*H05G 1/26* (2006.01)

(52) U.S. Cl.
CPC .................. *H01J 2235/1216* (2013.01); *H01J 2235/1262* (2013.01); *H01J 2235/167* (2013.01); *H05G 1/26* (2013.01)

(56) References Cited

U.S. PATENT DOCUMENTS

| | | | | |
|---|---|---|---|---|
| 10,743,396 | B1 * | 8/2020 | Kawase | H05G 1/06 |
| 11,140,763 | B2 | 10/2021 | Kawase | |
| 2002/0131554 | A1 | 9/2002 | Fleming et al. | |
| 2013/0114794 | A1 * | 5/2013 | Yamamoto | H05G 1/06 378/140 |
| 2019/0150255 | A1 * | 5/2019 | Kawase | H01J 35/16 378/111 |
| 2021/0029809 | A1 * | 1/2021 | Ishii | H05G 1/26 |
| 2021/0063324 | A1 * | 3/2021 | Kawase | H01J 35/18 |
| 2021/0212188 | A1 * | 7/2021 | Kawase | G01N 23/083 |
| 2024/0306283 | A1 * | 9/2024 | Kawase | H05G 1/06 |

FOREIGN PATENT DOCUMENTS

| | | | |
|---|---|---|---|
| JP | 2016100290 | A | 5/2016 |
| JP | 2018073625 | A | 5/2018 |
| JP | 6704100 | B1 | 5/2020 |
| TW | 201543964 | A | 11/2015 |
| WO | 2013042812 | A1 | 3/2013 |
| WO | 2021044525 | A1 | 3/2021 |

OTHER PUBLICATIONS

Int'l Search Report (PCT/ISA/210) w/ translation & Written Opinion (PCT/ISA/237) mailed on May 31, 2022, by the Japanese Patent Office in Int'l App. No. PCT/JP2022/016707. (9 pages).
Decision to Grant dated on Jan. 12, 2024 by the Japanese Patent Office in corresponding Japanese Patent Application No. 2023-565995. (7 pages).

* cited by examiner

X-RAY GENERATING APPARATUS AND X-RAY IMAGING APPARATUS

CROSS-REFERENCE TO RELATED APPLICATIONS

This application is a Continuation of International Patent Application No. PCT/JP2022/016707, filed Mar. 31, 2022, which is hereby incorporated by reference herein in its entirety.

BACKGROUND OF THE INVENTION

Field of the Invention

The present invention relates to an X-ray generating apparatus and an X-ray imaging apparatus.

Background Art

PTL 1 discloses an X-ray generating apparatus including an X-ray generating unit, a voltage supply unit, a storage housing that stores the X-ray generating unit and the voltage supply unit, and insulating components arranged between the internal surface of the storage housing and at least part of the X-ray generating unit. The insulating components can constitute an insulating housing surrounding the X-ray generating unit and the voltage supply unit. The insulating housing can include a first housing having a first opening and a second housing having a second opening. The second housing can be arranged so as to accommodate part of the first housing in the second opening and cover the first opening of the first housing.

CITATION LIST

Patent Literature

PTL 1: Japanese Patent No. 6704100

SUMMARY OF THE INVENTION

In the X-ray generating apparatus, the heat generated from the voltage supply unit and the X-ray generating unit can increase the temperature in the insulating housing. The insulating housing can function as at least a heat-insulating housing and prevent heat from radiating from the X-ray generating apparatus.

The present invention provides a technique advantageous in suppressing an increase in the temperature of the X-ray generating apparatus by promoting the radiation of heat from the X-ray generating apparatus.

A first aspect of the present invention is related to an X-ray generating apparatus, and the X-ray generating apparatus comprises: an X-ray generating unit having a first bottom surface including a radiation portion configured to emit X-rays, a second bottom surface on an opposite side to the first bottom surface, and a side surface; a driving circuit configured to drive the X-ray generating unit; an accommodation housing configured to accommodate the X-ray generating unit and the driving circuit; and an insulating component arranged in the accommodation housing, wherein the insulating component includes a first insulating member arranged between the driving circuit and the accommodation housing and a second insulating member arranged between the X-ray generating unit and the accommodation housing, at least part of a first space is defined by an external surface of the first insulating member and an internal surface of the accommodation housing, at least part of a second space is defined by an external surface of the second insulating member and the internal surface of the accommodation housing, at least part of a third space is defined by the side surface of the X-ray generating portion and an internal surface of the second insulating member, at least part of a fourth space is defined by the second bottom surface of the X-ray generating portion and an internal surface of the first insulating member, the second space communicates with the third space through a first communicating portion without intervention of the first space and the fourth space, the first space communicates with the fourth space through a second communicating portion without intervention of the second space and the third space, and the first space, the second space, the third space, and the fourth space are filled with an insulating liquid.

A second aspect of the present invention comprises the X-ray generating apparatus according to the first aspect; and an X-ray detector configured to detect X-rays emitted from the X-ray generating apparatus.

DESCRIPTION OF THE EMBODIMENTS

Figure 1:
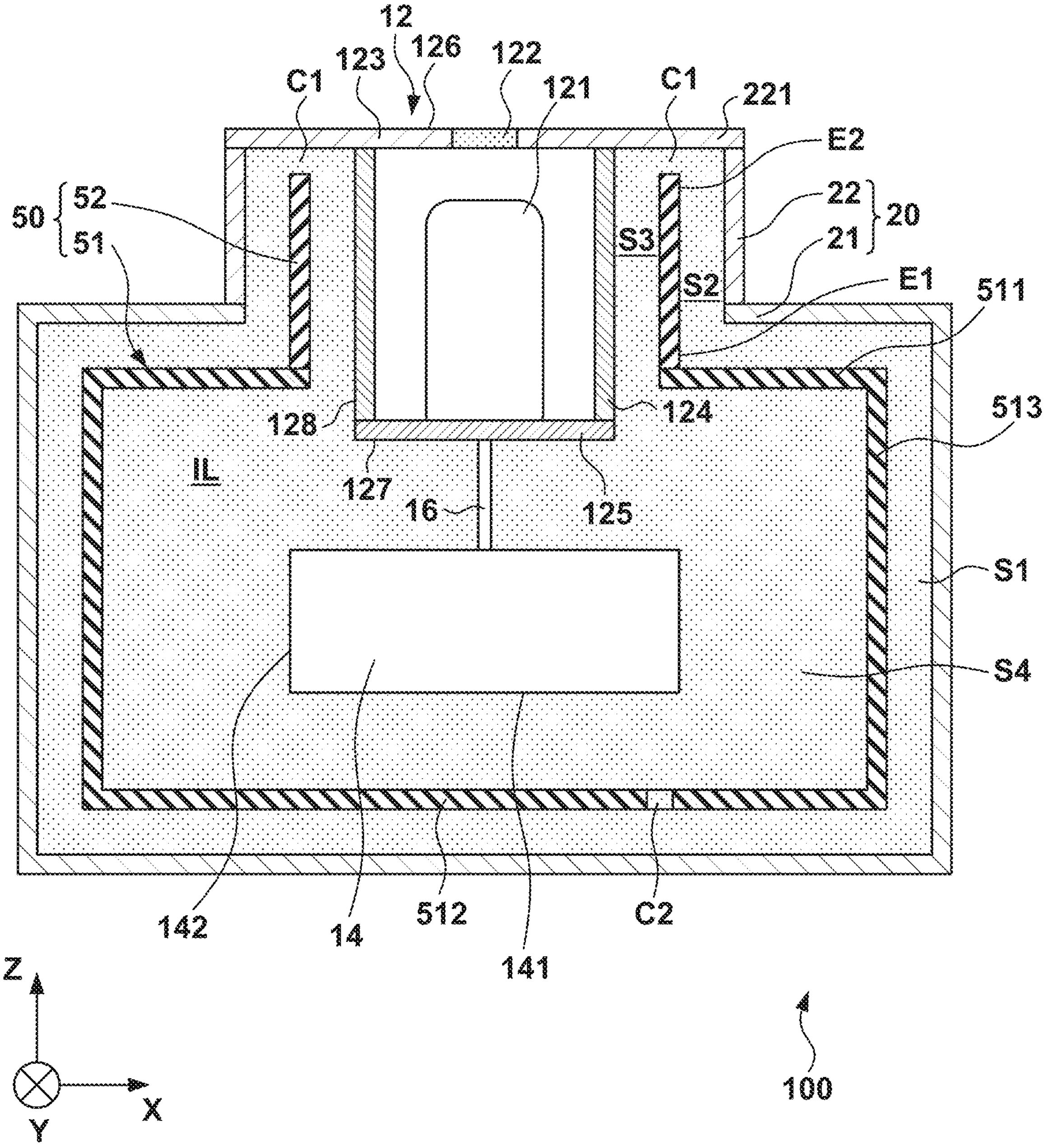
FIG. 1 is a view schematically showing the arrangement of an X-ray generating apparatus according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Directions will be explained according to an XYZ coordinate system in the following description.

FIG. 1 is a schematic sectional view of the arrangement of an X-ray generating apparatus 100 according to one embodiment. The X-ray generating apparatus 100 includes an X-ray generating unit 12, a driving circuit 14 that drives the X-ray generating unit 12, an accommodation housing 20 that accommodates the X-ray generating unit 12 and the driving circuit 14, and an insulating component 50 arranged in the accommodation housing 20. Concerning a geometric shape, the X-ray generating unit 12 can have a first bottom surface 126 including a radiation portion 122 that radiates X-rays, a second bottom surface 127 on the opposite side to the first bottom surface 126, and a side surface 128. The X-ray generating unit 12 can have, for example, a cylindrical shape.

The X-ray generating unit 12 can include an insulating tube 124, an anode 123 including the radiation portion 122, and a cathode 125 including an electron emitting unit 121 that emits electrons. The anode 123 can be arranged on one end of the insulating tube 124 so as to form the first bottom surface 126. The cathode 125 can be arranged on the other end of the insulating tube 124 so as to form the second bottom surface 127. The radiation portion 122 can include a target that generates X-rays upon receiving electrons emitted from the electron emitting unit 121 in the positive direction of the Z-axis and a target holding portion that holds the target.

The driving circuit 14 can generate one or a plurality of negative drive potentials for driving the X-ray generating unit 12 upon receiving an externally supplied voltage. The X-ray generating unit 12 is configured as, for example, an X-ray generating unit based on an anode ground scheme, and the anode 123 of the X-ray generating unit 12 can be electrically connected to the accommodation housing 20. The negative potential generated by the driving circuit 14 can be supplied to the cathode 125 of the X-ray generating unit 12 via a cable 16. The driving circuit 14 can generate, for example, a potential difference of 100 kV (for example, −100 kV). The cable 16 can include a conductive member and an insulating material covering the conductive member but may not include the insulating material. The X-ray generating unit 12 and the driving circuit 14 are heat sources.

The space between the accommodation housing 20 and the insulating component 50 and the space inside the insulating component 50 can be filled with an insulating liquid (for example, an insulating oil). The cathode 125 of the X-ray generating unit 12 is electrically insulated to the accommodation housing 20. The accommodation housing 20 can be shaped such that a portion on which the X-ray generating unit 12 is arranged protrudes from the peripheral portion of the portion. In another aspect, the accommodation housing 20 can be shaped such that a central portion including the portion on which the X-ray generating unit 12 is arranged protrudes from the peripheral portion. Such a structure is advantageous in arranging the X-ray generating unit 12 near a sample.

The accommodation housing 20 can be formed of a conductor such as a metal. The accommodation housing 20 can be grounded and electrically connected to the anode 123 of the X-ray generating unit 12. The accommodation housing 20 can include a first accommodation portion 21 surrounding all or part of the driving circuit 14 (around the Z-axis, that is, the axis parallel to the emitting direction of electrons from the electron emitting unit 121). The first accommodation portion 21 may surround all or part of the driving circuit 14 and part of the X-ray generating unit 12 (around the Z-axis).

The accommodation housing 20 can include a portion facing a bottom surface 141 of the driving circuit 14 through the insulating component 50 and a portion facing a side surface 142 of the driving circuit 14 through the insulating component 50. The bottom surface 141 may be formed of one flat surface, a plurality of flat surfaces, or surfaces including a curved surface. The side surface 142 may be formed of one curved surface such as a cylindrical surface, a plurality of flat surfaces, or surfaces including a curved surface. The accommodation housing 20 can include a second accommodation portion 22 surrounding all or part of the X-ray generating unit 12 (around the Z-axis). The accommodation housing 20 can include a portion facing the side surface 128 of the X-ray generating unit 12 through the insulating component 50. For example, the second accommodation portion 22 is arranged so as to define a space protruding from a space defined by the first accommodation portion 21 in the positive direction of the Z-axis.

The insulating component 50 can be formed of a resin impregnated glass cloth laminated body (for example, a laminated plate or a laminated tube) formed by heating and pressurizing. The insulating component 50 can include a first insulating member 51 arranged between the driving circuit 14 and the accommodation housing 20 (or the first accommodation portion 21) and a second insulating member 52 arranged between the X-ray generating unit 12 and the accommodation housing 20 (or the second accommodation portion 22).

In another aspect, the insulating component 50 can include the first insulating member 51 surrounding all or part of the driving circuit 14 (around the Z-axis). The first insulating member 51 may surround all or part of the driving circuit 14 and part of the X-ray generating unit 12 (around the Z-axis). The first insulating member 51 can include a portion facing the bottom surface 141 of the driving circuit 14 and a portion facing the side surface 142 of the driving circuit 14. The insulating component 50 can include the second insulating member 52 surrounding all or part of the X-ray generating unit 12 (around the Z-axis). The second insulating member 52 can include a portion facing the side surface 128 of the X-ray generating unit 12. For example, the second insulating member 52 is arranged so as to define a space protruding from the space defined by the first insulating member 51 in the positive direction of the Z-axis. The first insulating member 51 can include a first portion 511 extending from the second insulating member 52 in the radiation direction, a second portion 512 expanding parallel to the first portion 511, and a third portion 513 extending in the Z-axis direction so as to connect the first portion 511 and the second portion 512.

At least part of a first space S1 can be defined by the external surface of the first insulating member 51 and the internal surface of the accommodation housing 20. At least part of a second space S2 can be defined by the external surface of the second insulating member 52 and the internal surface of the accommodation housing 20. At least part of a third space S3 can be defined by the side surface 128 of the X-ray generating unit 12 and the internal surface of the second insulating member 52. At least part of a fourth space S4 can be defined by the second bottom surface 127 of the X-ray generating unit 12 and the internal surface of the first insulating member 51. The first space S1, the second space S2, the third space S3, and the fourth space S4 can be filled with an insulating liquid IL.

The insulating component 50 can be arranged so as to form a plurality of communicating portions that cause the internal spaces of the insulating component 50 (the third space S3 and the fourth space S4) to communicate with the external spaces of the insulating component 50 (the first space S1 and the second space S2). For example, the second space S2 can communicate with the third space S3 through a first communicating portion C1 without intervention of the first space S1 and the fourth space S4. In addition, the first space S1 can communicate with the fourth space S4 through a second communicating portion C2 without intervention of the second space S2 and the third space S3. In other words, the insulating component 50 can be configured to cause the second space S2 to communicate with the third space S3 through the first communicating portion C1 without intervention of the first space S1 and the fourth space S4. In addition, the insulating component 50 can be configured to cause the first space S1 to communicate with the fourth space S4 through the second communicating portion C2 without intervention of the second space S2 and the third space S3.

The first communicating portion C1 makes it possible to move the insulating liquid IL from the third space S3 to the second space S2 and to move the insulating liquid IL from the second space S2 to the third space S3. The second communicating portion C2 makes it possible to move the insulating liquid IL from the first space S1 to the fourth space S4 and to move the insulating liquid IL from the fourth space S4 to the first space S1. For example, the insulating liquid IL can convect or circulate so as to reach the second space S2 from the third space S3 through the first communicating portion C1, reach the first space S1 from the second space S2, reach the fourth space S4 from the first space S1 through the second communicating portion C2, and reach the third space S3 from the fourth space S4. In another example, the insulating liquid IL can convect or circulate so as to reach the fourth space S4 from the third space S3, reach the first space S1 from the fourth space S4 through the second communicating portion C2, reach the second space S2 from the first space S1, and reach the third space S3 from the second space S2 through the first communicating portion C1.

The first communicating portion C1 may be one continuous opening for causing the second space S2 to communicate with the third space S3 or may include a plurality of openings separated from each other. The second communicating portion C2 may be one continuous opening for causing the first space S1 to communicate with the fourth space S4 or may include a plurality of openings separated from each other.

In the arrangement in which the second accommodation portion 22 protrudes from the first accommodation portion 21, and all or part of the X-ray generating unit 12 is arranged in the second accommodation portion 22, the insulating liquid IL tends to stay in the internal spaces of the second accommodation portion 22, that is, the second space S2 and the third space S3. The staying of the insulating liquid IL can accumulate heat and electric charge generated by the X-ray generating unit 12 and the driving circuit 14. It is preferable to provide the first communicating portion C1 and the second communicating portion C2 so as to facilitate convection or circulation of the insulating liquid IL. This makes it possible to quickly discharge heat and electric charge out of the accommodation housing 20 by moving the heat and electric charge to the external spaces of the insulating component 50, that is, the second space S2 and the first space S1.

In the example shown in FIG. 1, the second insulating member 52 includes a first end portion E1 coupled to the first insulating member 51 and a second end portion E2 on the opposite side to the first end portion E1. The accommodation housing 20 includes a top plate portion 221 facing the second end portion E2 of the second insulating member 52. The first communicating portion C1 is arranged between the internal surface of the top plate portion 221 and the second end portion E2. For example, the accommodation housing 20 is formed of a conductor, and the anode 123 of the X-ray generating unit 12 can form part of the top plate portion 221. In other words, the first bottom surface 126 of the X-ray generating unit 12 can form part of the external surface of the accommodation housing 20. Note that in the scheme in which the anode 123 is not grounded, the top plate portion 221 can be formed of a member electrically separated from the anode 123.

The first insulating member 51 can include the second portion (bottom surface portion) 512 parallel to the first bottom surface 126 of the X-ray generating unit 12. The second communicating portion C2 can be arranged in the second portion (bottom surface portion) 512. This arrangement is advantageous in improving the cooling effect of the X-ray generating unit 12 and the driving circuit 14 using the insulating liquid IL by widening the path of convection of the insulating liquid IL. The second communicating portion C2 may be arranged in the third portion 513 or the first portion 511 of the first insulating member 51.

As exemplarily shown in FIG. 1, the fourth space S4 may include the space sandwiched by the side surface 128 of the X-ray generating unit 12 and the internal surface of the first insulating member 51.

Figure 2:
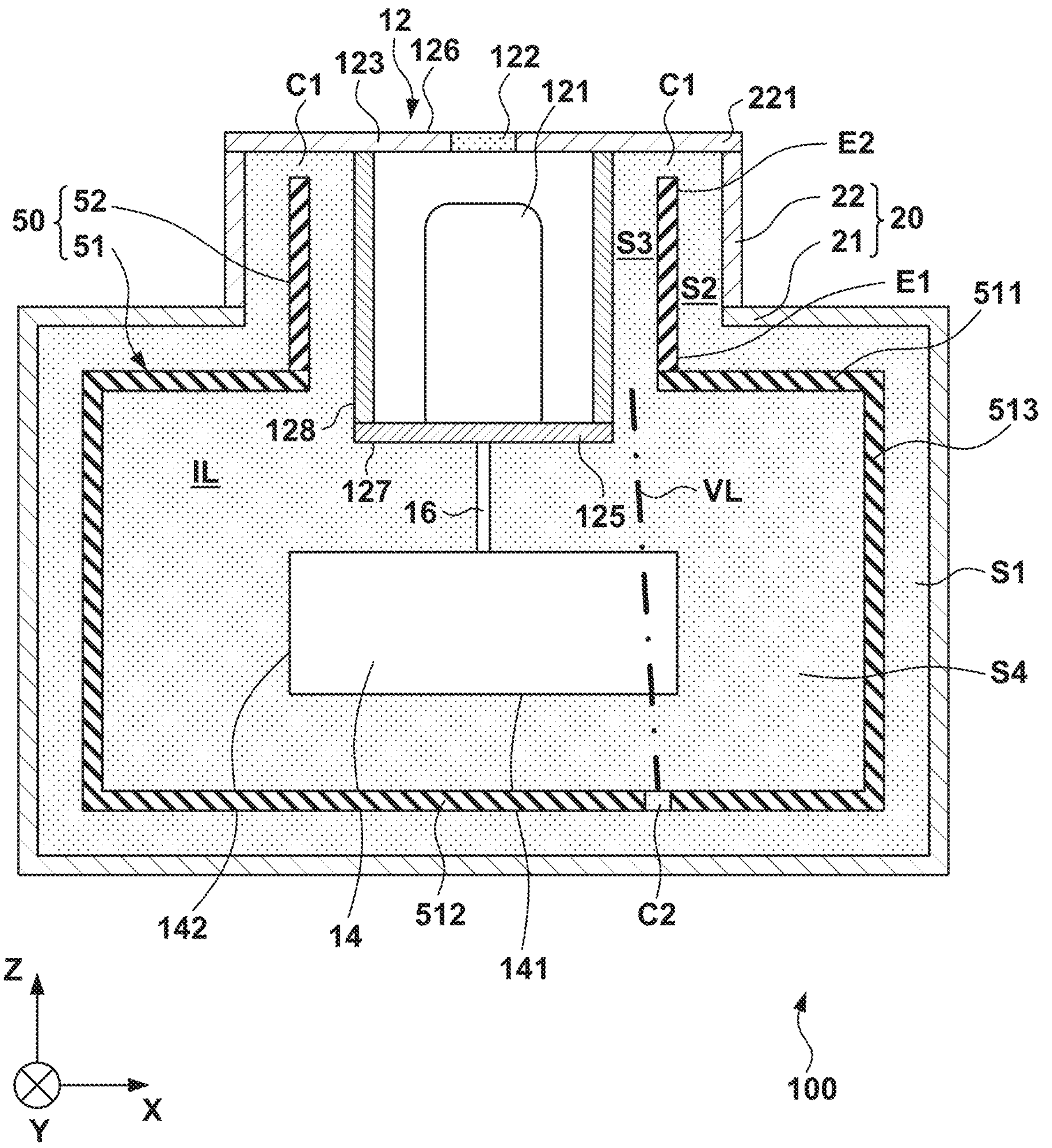
FIG. 2 is a view for explaining the arrangement of the X-ray generating apparatus according to one embodiment.
Figure 3:
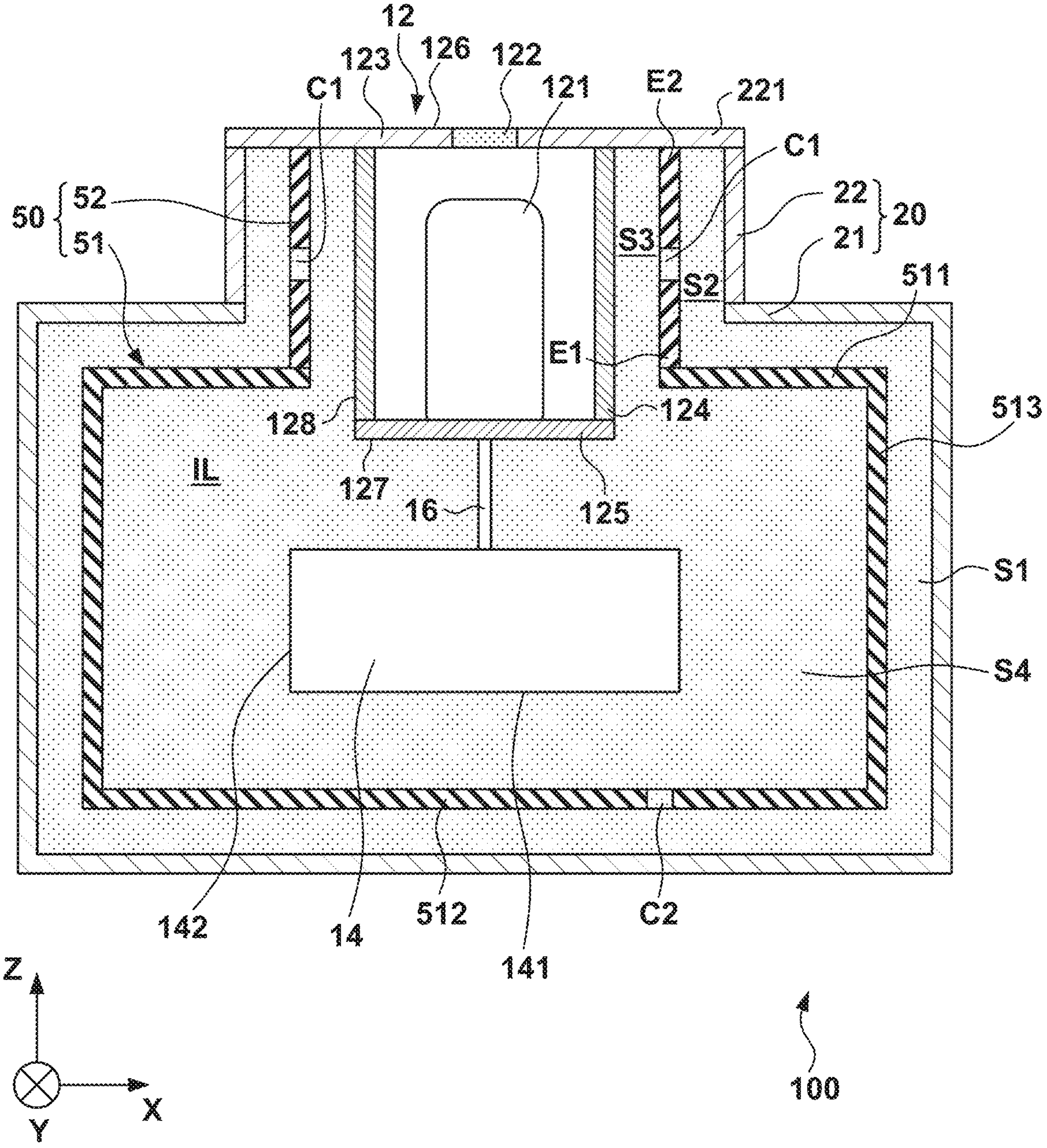
FIG. 3 is a view schematically showing the arrangement of the X-ray generating apparatus according to one embodiment.
Figure 4:
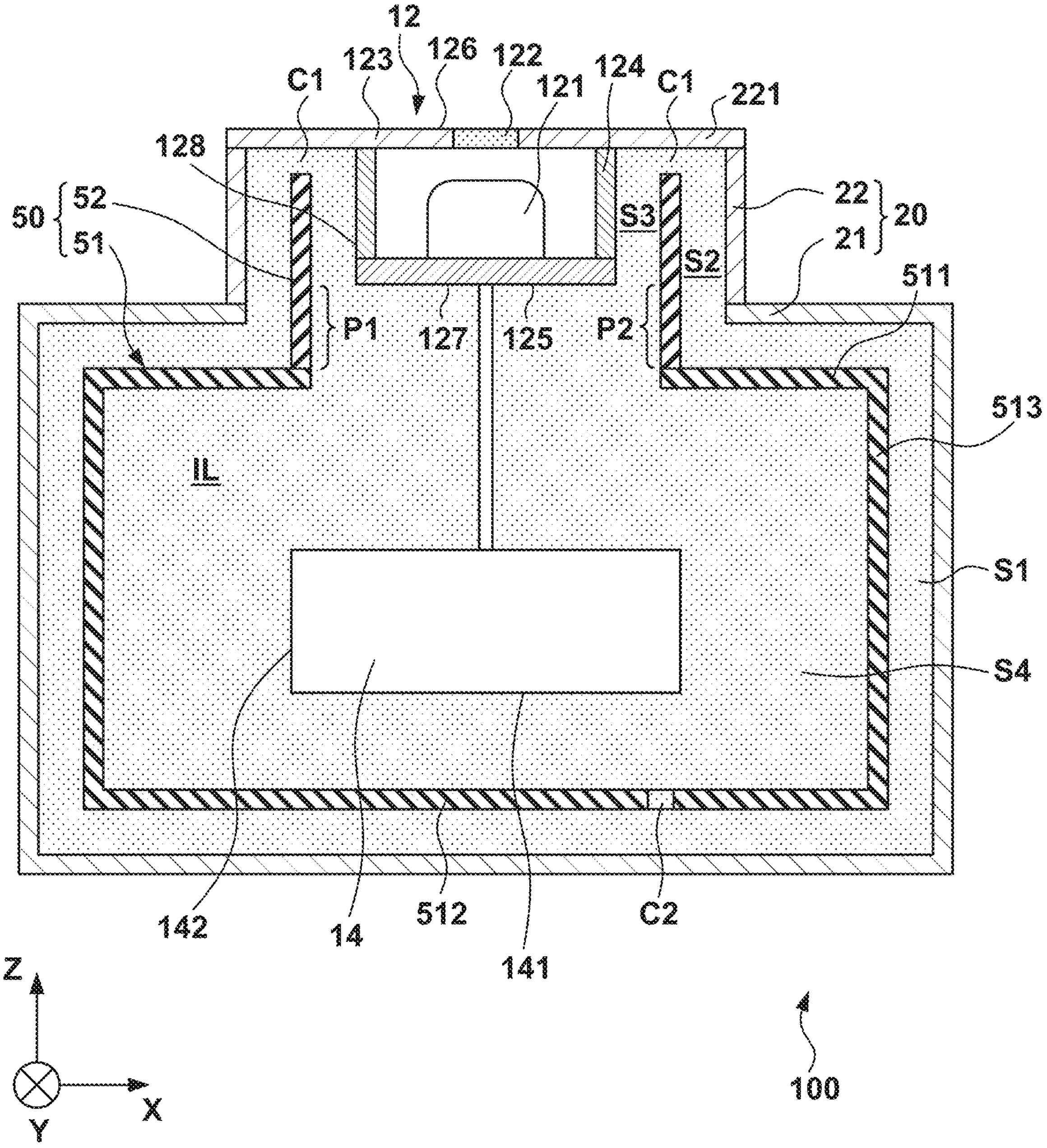
FIG. 4 is a view schematically showing the arrangement of the X-ray generating apparatus according to one embodiment.

As exemplarily shown in FIG. 2, the third space S3, the second communicating portion C2, and the driving circuit 14 can be arranged such that a virtual straight line VL extending through the driving circuit 14 exists so as to connect the third space S3 and the second communicating portion C2 to each other. As exemplarily shown in FIG. 3, the first communicating portion C1 may be arranged in the second insulating member 52, more specifically, between the first end portion E1 and the second end portion E2. As exemplarily shown in FIG. 4, the fourth space S4 may include a space where a portion P1 and another portion P2 of the inner side surface of the second insulating member 52 face each other without intervention of the X-ray generating unit 12.

Figure 5:
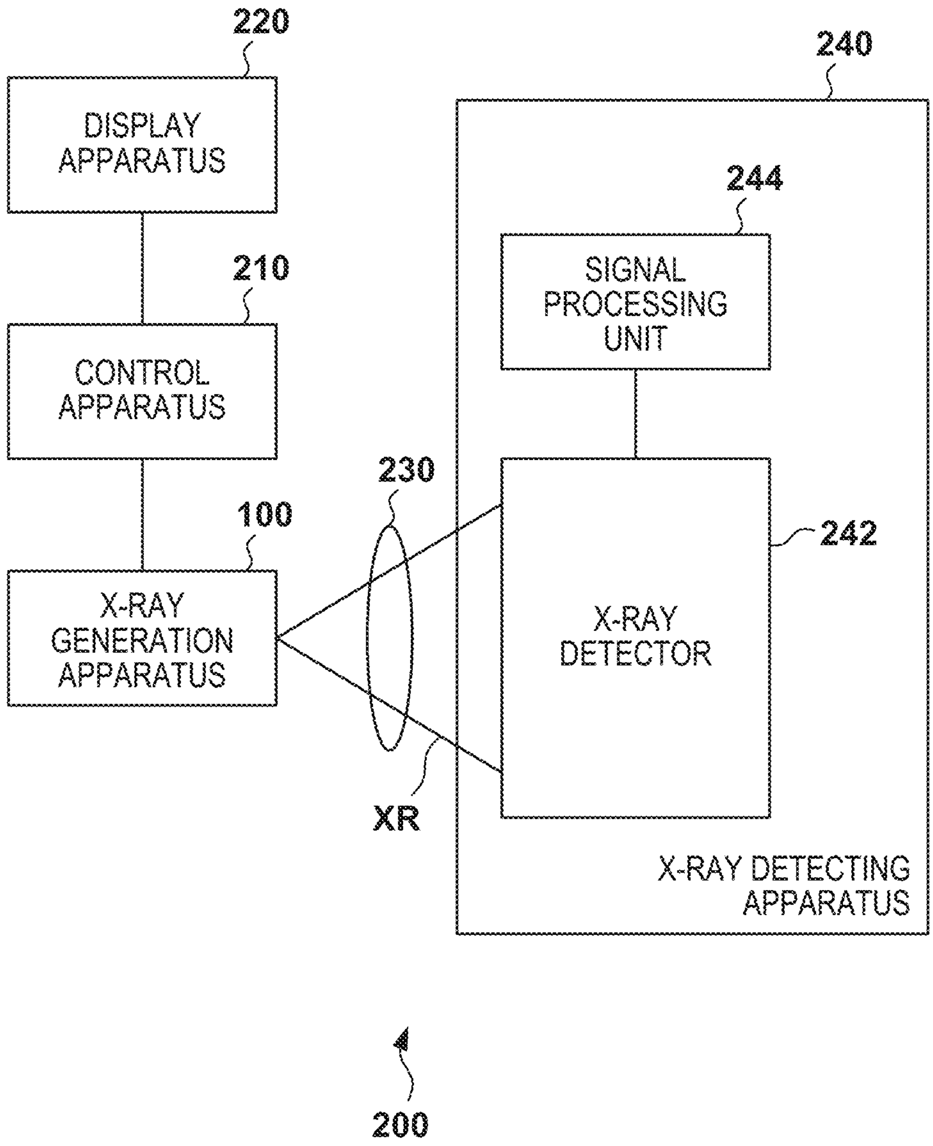
FIG. 5 is a view schematically showing the X-ray imaging apparatus according to one embodiment.

FIG. 5 shows the arrangement of an X-ray imaging apparatus 200 according to one embodiment. The X-ray imaging apparatus 200 can include the X-ray generating apparatus 100 and an X-ray detecting apparatus 240 that detects X-rays XR emitted from the X-ray generating apparatus 100 and transmitted through an object 230. The X-ray imaging apparatus 200 may further include a control apparatus 210 and a display apparatus 220. The X-ray detecting apparatus 240 can include an X-ray detector 242 and a signal processing unit 244. The control apparatus 210 can control the X-ray generating apparatus 100 and the X-ray detecting apparatus 240. The X-ray detector 242 detects or captures the X-rays XR emitted from the X-ray generating apparatus 100 and transmitted through the object 230. The signal processing unit 244 can process the signal output from the X-ray detector 242 and supply the processed signal to the control apparatus 210. The control apparatus 210 causes the display apparatus 220 to display an image based on the signal supplied from the signal processing unit 244.

REFERENCE SIGNS LIST

100: X-ray generating apparatus, 12: X-ray generating unit, 14: driving circuit, 16: cable, 20: accommodation housing, 21: first accommodation portion, 22: second accommodation portion, 50: insulating component, 51: first insulating member, 52: second insulating member, 511: first portion, 512: second portion, 513: third portion, 121: electron emitting unit, 122: radiation portion, 123: anode, 124: insulating tube, 126: first bottom surface, 127: second bottom surface, 128: side surface, S1: first space, S2: second space, S3: third space, S4: fourth space, C1: first communicating portion, C2: second communicating portion

The invention claimed is:

1. An X-ray generating apparatus comprising:

an X-ray generating unit having a first bottom surface formed of an anode including a radiation portion configured to emit X-rays, a second bottom surface on an opposite side to the first bottom surface, and a side surface;

a driving circuit configured to drive the X-ray generating unit;

an accommodation housing configured to accommodate the X-ray generating unit and the driving circuit; and an insulating component arranged in the accommodation housing, wherein the accommodation housing has a first accommodation portion and a second accommodation portion, the second accommodation portion is arranged so as to define a space protruding from a space defined by the first accommodation portion, at least a part of the X-ray generating unit is accommodated in the second accommodation portion, the driving circuit is accommodated in the first accommodation portion, the insulating component includes a first insulating member arranged between the driving circuit and the first accommodation portion and a second insulating member arranged between the X-ray generating unit and the second accommodation portion, at least part of a first space is defined by an external surface of the first insulating member and an internal surface of the first accommodation portion, at least part of a second space is defined by an external surface of the second insulating member and an internal surface of the second accommodation portion, at least part of a third space is defined by the side surface of the X-ray generating unit and an internal surface of the second insulating member, at least part of a fourth space is defined by the second bottom surface of the X-ray generating unit and an internal surface of the first insulating member, the second space communicates with the third space through a first communicating portion without intervention of the first space and the fourth space, the first space communicates with the fourth space through a second communicating portion without intervention of the second space and the third space, the second insulating member includes a first end portion coupled to the first insulating member and a second end portion on an opposite side to the first end portion, the second accommodation portion includes a top plate portion facing the second end portion of the second insulating member, the anode forming part of the top plate portion, the first communicating portion is arranged between an internal surface of the top plate portion and the second end portion, the first insulating member includes a bottom surface portion parallel to the first bottom surface, the second communicating portion being arranged in the bottom surface portion, the third space, the second communicating portion and the driving circuit are arranged such that a virtual straight line extending through the driving circuit exists so as to connect the third space and the second communicating portion, the first space, the second space, the third space, and the fourth space are filled with an insulating liquid, and the insulating liquid circulates between an outside space of the insulating component, which includes the first space and the second space, and an inside space of the insulating component, which includes the third space and the fourth space, through the first communicating portion and the second communicating portion.

2. The X-ray generating apparatus according to claim 1, wherein the accommodation housing is formed of a conductor.

3. The X-ray generating apparatus according to claim 1, wherein the first insulating member includes a first insulating portion extending from the first end portion of the second insulating member in a radiation direction, and a second portion extending so as to connect the first insulating portion and the bottom surface portion.

4. The X-ray generating apparatus according to claim 1, wherein the fourth space includes a space sandwiched by the side surface of the X-ray generating unit and the internal surface of the first insulating member.

5. The X-ray generating apparatus according to claim 1, wherein the fourth space includes a space where a part and another part of the internal surface of the second insulating member face each other without intervention of the X-ray generating unit.

6. The X-ray generating apparatus according to claim 1, wherein the accommodation housing is formed of a conductor.

7. The X-ray generating apparatus according to claim 6, wherein the accommodation housing is grounded.

8. The X-ray generating apparatus according to claim 1, wherein the first bottom surface forms part of an external surface of the accommodation housing.

9. An X-ray imaging apparatus comprising:

an X-ray generating apparatus defined in claim 1; and an X-ray detector configured to detect X-rays emitted from the X-ray generating apparatus.

* * * * *